United States Patent [19]

Hayes

[11] Patent Number: 5,080,246
[45] Date of Patent: * Jan. 14, 1992

[54] CLOSURE HAVING A SPRING OPEN TAMPER EVIDENCING BAND

[75] Inventor: Thomas H. Hayes, Lancaster, Ohio

[73] Assignee: Anchor Hocking Packaging Company, Lancaster, Ohio

[*] Notice: The portion of the term of this patent subsequent to Dec. 18, 2007 has been disclaimed.

[21] Appl. No.: 516,528

[22] Filed: Apr. 30, 1990

Related U.S. Application Data

[63] Continuation-in-part of Ser. No. 401,966, Sep. 1, 1989, Pat. No. 4,978,016.

[51] Int. Cl.⁵ .............................................. B65D 41/34
[52] U.S. Cl. .................................................... 215/252
[58] Field of Search ..................... 215/230, 252, 306

[56] References Cited

U.S. PATENT DOCUMENTS

| | | |
|---|---|---|
| 4,106,818 | 4/1980 | Brownbill . |
| 4,299,328 | 11/1981 | Ochs et al. . |
| 4,305,516 | 12/1981 | Perne et al. . |
| 4,394,918 | 7/1983 | Grussen .................. 215/252 X |
| 4,418,828 | 12/1983 | Wilde et al. . |
| 4,432,461 | 2/1984 | Mumford et al. . |
| 4,458,822 | 7/1984 | Ostrowsky . |
| 4,478,343 | 10/1984 | Ostrowsky .................. 215/252 |
| 4,526,282 | 7/1985 | Dutt et al. .................. 215/252 |
| 4,545,496 | 10/1985 | Wilde et al. . |
| 4,592,475 | 6/1986 | Hannon et al. .................. 215/252 |
| 4,595,110 | 6/1986 | Herr .................. 215/252 |
| 4,657,153 | 4/1987 | Hayes .................. 215/252 |
| 4,666,053 | 5/1987 | Corcoran et al. . |
| 4,732,289 | 3/1988 | Granat et al. .................. 215/252 |
| 4,796,770 | 1/1989 | Begley . |
| 4,805,792 | 2/1989 | Lecinski, Jr. .................. 215/252 X |
| 4,807,771 | 2/1989 | Roy et al. . |
| 4,848,614 | 7/1989 | Csaszar .................. 215/252 |
| 4,875,594 | 10/1989 | Ochs .................. 215/252 |
| 4,895,266 | 1/1990 | Begley .................. 215/252 X |

FOREIGN PATENT DOCUMENTS 2033350 11/1975 United Kingdom .

*Primary Examiner*—Gary E. Elkins
*Assistant Examiner*—Vanessa Carerro
*Attorney, Agent, or Firm*—Wood, Herron & Evans

[57] ABSTRACT

A closure for a container has a skirt with a frangibly attached tamper indicating band having a band retaining element in the form of a conical hoop. The hoop is hinged to the band by arcuate hinges which are spaced by ports along the hinge line, the ports extending part way toward but not to the distal edge of the hoop. The band is connected to the skirt along a circumferential score line. Another line of weakness, generally parallel to the axis of the closure, extends across the width of the band from the circumferential score line downwardly to the hinge line between the hoop and the tamper evidencing band, and the hoop is split or separated from the hinge line, inwardly to its distal edge. The hoop is under hoop stress in its upfolded configuration and that stress causes the band to break and spring open when the closure is removed from a container, thereby providing more visible evidence of such removal and facilitating resealing. The hoop may be connected to the closure skirt so that the band and the hoop will remain attached to the closure upon opening, rather than separating, thereby obviating a possible source of litter.

15 Claims, 1 Drawing Sheet

CLOSURE HAVING A SPRING OPEN TAMPER EVIDENCING BAND

RELATED APPLICATION

This application is a continuation-in-part of my co-pending application Ser. No. 07/401,966, filed Sept. 1, 1989, titled "Tamper Indicating Closure Having Retaining Hoop With Relief Windows, now U.S. Pat. No. 4,978,016, issued Dec. 18, 1990."

This invention relates to container closures of the type having a tamper indicating band which provides a visible indication that the container has been opened.

BACKGROUND

The pending application identified above discloses a closure having a tamper indicating band which is frangibly attached to the closure as formed, and which is torn open when the closure is first removed so as to give a visible indication of opening. A band retainer in the form of an inwardly projecting conical hoop around the lower edge of the band engages under a locking bead around the container, thereby preventing the band from being removed with the closure. When the closure is turned to remove it from the container, as by unscrewing it, the inner edge of the hoop translates upwardly with the rotation of the closure and engages under the locking bead around the container. This engagement arrests further upward movement of the hoop and the tamper evidencing band to which it is joined. The band, which is frangibly connected to the rest of the closure along a peripheral line of weakness, splits away, thereby providing visible evidence that the closure has been at least partially opened. In the closure of that application the hoop is hinged to the lower edge of the band by arcuate hinges which are interrupted by ports or "windows" along the hinge line. The windows extend partway toward but not to the distal edge of the hoop. The hoop is molded in a "down" position in which it projects downwardly and inwardly from the skirt, but before application to the container it is turned inside out from the "as molded" position, to an upwardly extending "use" position. As this is done, the distal edge of the hoop is deformed, and the deformation "sets" and remains in the use position. The distal edge of the hoop is deformed, by bending radially outward, above the windows. The deformation relieves hoop strength sufficiently to make the inversion possible but the hoop thereafter still retains good container gripping strength in the use position. As a result of the set of the deformation, the hoop in its use position assumes an advantageous polygonal peripheral shape, rather than a circular shape, and better grips the container but without excessive rigidity of the hoop. The polygonal shape of the hoop enables it to accommodate the usual manufacturing variations and tolerances in glass container finishes.

While separation of the tamper evidencing band and hoop of that closure from the rest of the closure provides visible evidence of opening, such evidence may not be immediately apparent to all users, and it is desirable to provide a still more visible indication of the partial opening of the closure. Conceivably, someone might not notice a separated band because it might be separated from the rest of the closure by only a narrow annular space. Moreover, in the construction shown in that application, the separation of the tamper evidencing band from the rest of the closure can hinder recycling: a plastic band on a glass container makes recycling of the container more difficult. On the other hand, if the band is separated and does not remain on the container, then it may become litter.

For these reasons it has been desirable to provide a closure having a tamper evidencing band which will provide more visible evidence of opening than just an axial separation from the rest of the closure. It has also been desirable to provide a closure which will remain attached to the closure after opening, so that it is not left on the container and thus minimizes the possibility of littering, but which does not thereafter interfere with the resealing of the closure.

BRIEF DESCRIPTION OF THE INVENTION

In accordance with this invention, the tamper evidencing band and hoop may be generally of the type described in the above-identified pending application Ser. No. 401,966, but they also have a vertical line of weakness across them. This line extends from the peripheral line of weakness around which the band separates from the closure skirt above it, substantially to the distal edge of the hoop. It is preferably a partial or full split across the width of the band, but alternatively may be an area thinner than the adjacent band; on the hoop it is a split across most or all of the width of the hoop.

The provision of this vertical line of weakness has a surprising effect upon opening. Not only do the band and hoop rupture across their width so that they can be removed upwardly past the locking bead, but they also "spring open" to a significantly wider diameter, from a closed loop to an open or "C" shape, thereby making the opening much more evident. (The provision of a thinned web as the line of weakness across the hoop, as distinguished from a vertical split across it, does not permit the hoop to break so readily; the hoop tends to stretch and turn inside out rather than break, and does not provide the same spring open results.)

Optionally, the band can be permanently attached to the closure skirt by a connector or bridge so that the band and hoop remain joined to the closure after separation along the peripheral line of weakness. The connector is preferably located adjacent the vertical line of weakness.

THE PRIOR ART

Ochs et al U.S. Pat. No. 4,299,328, owned the same assignee as this application, shows a tamper-proof bottle cap with a band which ruptures around a circumferential line of weakness, but the band has no vertical line of weakness.

Closures with tamper evidencing bands which split vertically to release from the container, are known in the art. Corcoran et al U.S. Pat. No. 4,666,053 shows a band with a vertical score line and which remains connected to the closure after removal. The fractured band disclosed there takes on a curl-like configuration like a pigtail, but does not spring open. Wilde U.S. Pat. No. 4,545,496 shows a related type of closure.

DESCRIPTION OF THE DRAWING

The invention can best be further described by reference to the accompanying drawings, in which.

DETAILED DESCRIPTION

Figure 1:
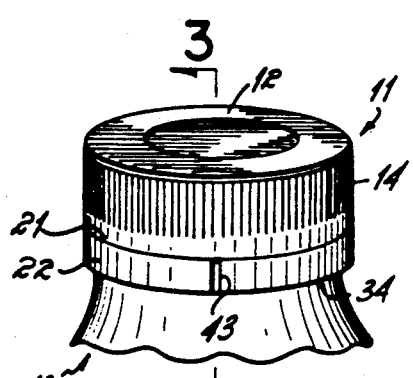
FIG. 1 is a perspective view of the top portion of a container having a closure in accordance with a preferred form of this invention.

In the drawings a container 10 is shown having a closure 11 applied to its top opening. For purpose of illustration closure 11 is shown as an integral or one-piece plastic molding having a top 12 and an integral skirt 14. However, it is contemplated that the principles of the invention are also useful with composite closures in which a metal or composite disk is seated in an annular plastic shell. As used herein the term "top" in reference to the closure includes both integral tops and separate tops.

The container 10 shown for purposes of illustration has closure securing means in the form of external threads 16 around its neck (FIG. 3), which engage internal threads 18 on the inside of the closure. It will be understood, however, that the invention is useful not only on threaded containers but also on containers having interrupted canted lugs or a snap bead.

Figure 2:
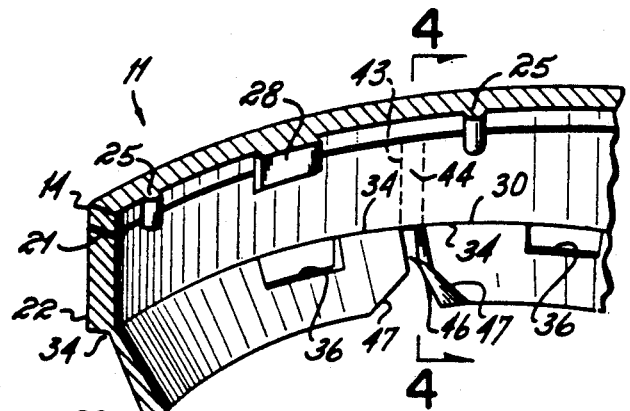
FIG. 2 is an enlarged fragmentary perspective view of the tamper indicating band and band retaining hoop of the closure, showing the hoop in its down, as-formed position.

Depending from closure skirt 14 is a severable tamper indicating band designated generally by 22, which is connected to skirt 14 along a circumferential line of weakness 21. Band 22 is in the form of an annulus and is formed integrally with closure skirt 14 to which it is connected along the line of weakness. The circumferential line of weakness may be a series of perforations or any other tearable configuration which will readily separate vertically from skirt when the closure is removed. In the embodiment shown the circumferential line of weakness comprises a series of spaced, vertical, frangible ribs or bridges 25 formed on the inside of band 22 and skirt 14 (see FIG. 3). A circumferential score line or partial cut around the outside of the shell severs band 22 from the remainder of the closure except at these bridges, which extend inwardly of the score line so as not to be cut by it, the bridges and score line thereby defining line of weakness 21. These bridges act as the "weak link" along which the tamper indicating band severs or tears from the skirt of the upper part of the closure. As will be discussed in more detail below, band 22 is preferably permanently attached to the skirt at one point around its circumference by a connector bridge or tab 28 (see FIGS. 2 and 5) which bridges the score line and which is angularly wider and/or thicker than the bridges 25 so as not to rupture with the bridges 25 when the closure is removed from the container.

The tamper evidencing means also includes a band retaining means in the form of a split hoop or flap 29 which is integrally formed with and joined to the band 22 along a hinge line 30 around the lower edge of the band. The closure is molded with hoop 29 in a first (or "down") position, in which it is angulated downwardly and inwardly from skirt 14, i.e., away from top 12 (see FIG. 2). The hoop is preferably tapered so that it is thicker at its inner or distal edge 32 than at hinge line 30. The taper provides greater stiffness and improves the spring opening action.

Hoop 29 is hingedly connected to tamper indicating band 22 by a series of hinges 34, each of which is of sufficient angular (circumferential) extent to act as an arcuate or over-center joint when the retainer is folded about the hinge. Hinges 34 are separated or spaced from one another by relief windows or ports 36, best shown in FIG. 5. The windows 36 preferably have a radially outer edge which is co-linear with the hinges 34 (i.e., which lies along hinge line 30). The relief windows do not extend to the distal or inner edge 32 of hoop 29; they preferably extend less than half of the distance to edge 32. The closer the windows extend to edge 32, i.e., the more nearly they sever the hoop, and the less the hoop strength. The windows are not merely areas of reduced thickness but rather are openings which extend through the band.

In circumferential extent, the hinges are wider than the windows; depending on closure size, the hinges may be substantially wider than the windows (e.g., about 1.5–6 times wider). The width of the windows is preferably at least twice their height, depending upon the diameter of the cap.

As explained in application Ser. No. 401,966 previously referred to, the windows have a surprising effect when the hoop 29 is inverted from its first, as-formed or down position (FIG. 2) to the use or up position shown in FIG. 3, in which the inner edge 32 is positioned to engage beneath a locking band 40 of container 10. As explained there, it has been found that the provision of the relief windows 36 permits the hoop to deform radially in the regions 37 between the hinges (i.e., at the windows) to reduce the otherwise excessive compression strength that would arise along distal edge 32 as the hoop is inverted from the down position to the up position. The deformation occurs during hoop inversion but remains thereafter in the up position. In the up position the hoop assumes a generally polygonal configuration when viewed in plan, rather than a circular shape. That shape enables the hoop better to grip the container side wall beneath the locking bead 40 without being too rigid, regardless of manufacturing tolerances in the dimensions of the container and the closure, and it more certainly shears the bridges 25 and separates the tamper indicating band from the rest of the closure.

Figure 3:
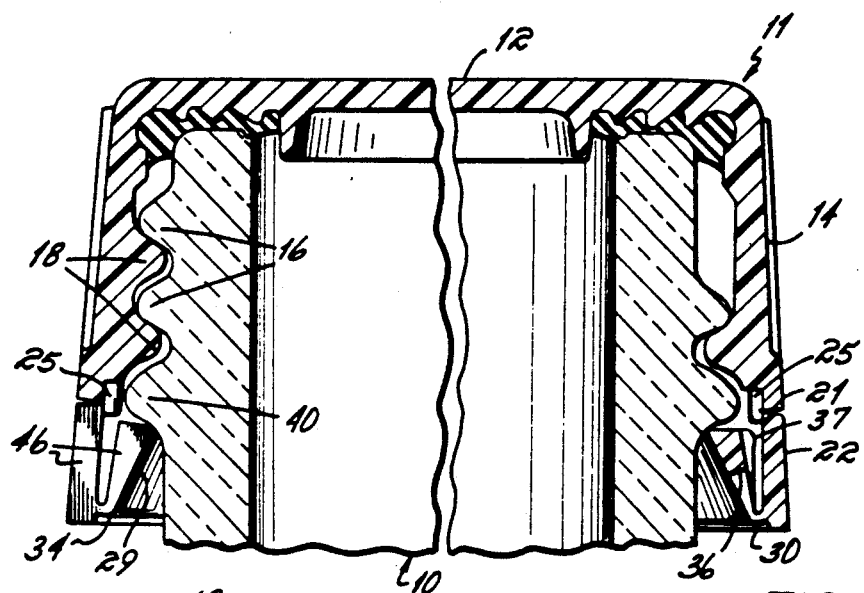
FIG. 3 is an enlarged axial cross section taken on line 3—3 of FIG. 1, modified to show a line of weakness in the form of a split across the band.
Figure 4:
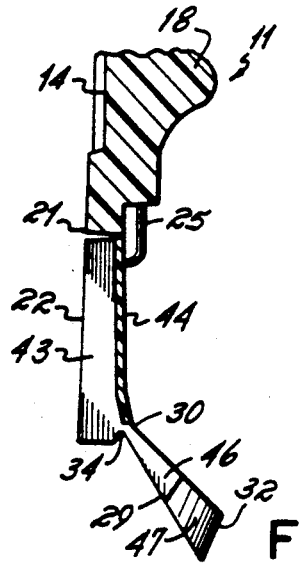
FIG. 4 is an enlarged vertical section taken on line 4—4 of FIG. 2.
Figure 5:
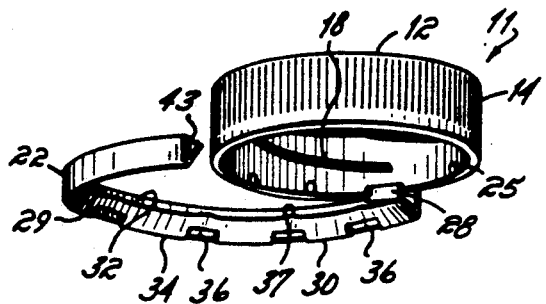
FIG. 5 is a perspective view of the closure after it has been removed from a container, showing the split open tamper indicating band and hoop.

Details of the means which enhance the tamper evidencing action on opening are best shown in FIGS. 3, 4, and 5. Tamper evidencing band 22 has a vertical line of weakness 43 which extends from hinge line 34 upwardly to peripheral line of weakness 21. This vertical line of weakness is preferably a vertical split as shown in FIG. 3, but can alternatively or partially be a circumferentially narrow region in which the thickness of the hoop is diminished (as a thin web 44 (FIGS. 2 and 4), so that it splits readily on closure opening. (A split is preferred as the line of weakness across the band because it is easier to mold than a thin web.) In vertical alignment with line of weakness 43 across the band, hoop 29 has a split 46 at least partially across its width. On either side of split 46 the hoop is connected to band 22 by hinges 34 (see FIG. 2).

The line of weakness permits the band and hoop to open circumferentially when the circumferential line of weakness 21 is ruptured. Preferably line of weakness 43 is positioned midway between two windows 36 (see FIG. 3), and is adjacent bridge 28. It has been found that the provision of a split rather than merely a thinned web across the hoop, improves the release when the closure is first removed. The distal corners 47, of the hoop adjacent the split 46 are preferably chamfered (see FIG. 2); this improves the invertability of the hoop from the down (as formed) position, to the up (use) position.

The closure can be manufactured as a single molding, with the hoop in the down position. The line of weakness 43 and split 46 are formed in molding. Prior to application on a container, the hoop is preferably inverted from the down position (shown in FIGS. 2 and 4) to the up position of FIG. 3 by a separate hoop folding operation. The distal edge 32 is permanently deformed at the windows as by this inversion, as described in my parent application (see FIG. 5). The closure is applied to a container with the hoop in the up position. As the closure is screwed or pressed downward on the container, the hoop bends about hinge line 30, sufficiently that the upturned distal edge 32 of the hoop is cammed outwardly over bead 40, and then springs inwardly to engage beneath the bead, as shown in FIG. 3. This action does not cause the band or hoop to rupture along line 43 or 21; but tests indicate that the hoop split 46 is desirable for this purpose.

When the closure is removed, engagement of distal edge 32 beneath locking band 40 of the container prevents the tamper evidencing band from moving upward with the container, and the bridges 25 or other line of weakness sever causing band 22 to separate along line 21 from the remainder of the closure, except at the connector 28. Surprisingly, as this occurs the band and hoop spring open in circumferential direction, at the vertical line of weakness 43, 46. This "spring open" action is believed to occur because the hoop, in the up position, is under substantial hoop stress, especially after it has engaqed locking band 40. The hoop resists this until the bridges 25 rupture; but when that occurs the hoop expands in the circumferential direction, and its now free end springs outwardly, as shown in FIG. 5. The other end of the hoop remains attached to the band by connector 28. This is a distinct advantage in comparison to prior art closures where the hoop opens but remains in essentially the same diameter, which hinders resealing. Having sprung open, the present hoop clears locking bead 40 as the container is unscrewed or removed. Thus the tamper evidencing band remains loosely attached to the closure on opening, and does not separate. Moreover, when the closure is reapplied, bead 40 does not engage or interfere with the hoop.

Having described the invention, what is claimed is:

1. A tamper indicating closure for use in sealing a container of the type having closure securing means and a locking bead below the securing means,
   said closure comprising,
   a top,
   a shell with a depending skirt,
   means on said skirt for engaging the closure securing means of the container,
   a tamper indicating band frangibly attache to and depending from said skirt,
   an inverted band-retaining hoop around a lower edge of said band for engaging the container below the locking bead thereof,
   arcuate hinges foldably connecting said hoop to said band, said hinges spaced along a hinge line at said lower edge of said band,
   relief windows in said hoop, said windows being adjacent said lower edge and spacing said hinges,
   said hoop being movable from a first, as molded, position in which it projects angularly inward in a direction away from said top, to a second, use, position in which it projects angularly inward and toward said top for engagement with the locking bead of a container,
   said hoop having portions adjacent the respective windows and which are deformed by stress when said hoop is in said second position,
   said band having a line of weakness extending from said hinge line up to an upper edge of said band, said line of weakness opening when said band is detached from said skirt,
   said hoop extending substantially entirely around the circumference of said band but having a gap across at least part of its width, in line with said line of weakness of said band,
   the stress in said hoop being of sufficient magnitude that when said closure is removed from a container said band and hoop spring open at said line of weakness and gap to a greater diameter so as to stand outwardly of said closure.

2. The closure of claim 1 wherein said line of weakness is a split across the width of said band.

3. The closure of claim 1 wherein said line of weakness is a rupturable thin web across the width of said band.

4. The closure of claim 1 wherein a connector connects said band to said skirt.

5. The closure of claim 4 wherein said connector is adjacent said line of weakness.

6. The closure of claim 1 wherein the gap in said hoop extends across its entire width, from said line of weakness of said band to the distal edge of said hoop.

7. The closure of claim 1 wherein said hoop has a distal edge which is continuous around the entire circumference thereof.

8. The closure of claim 7 wherein said windows do not extend to said distal edge.

9. The closure of claim 1 wherein said windows have outer edges which are colinear with said hinges.

10. The closure of claim 1 wherein the width of the windows is at least twice their height.

11. The closure of claim 1 wherein said hoop is thicker along said distal edge than along said hinges.

12. A tamper indicating closure for use in sealing a container of the type having closure securing means and a locking bead below the securing means,
   said closure comprising,
   a top,
   a shell with a depending skirt,
   means on said skirt for engaging the closure securing means of the container,
   a tamper indicating band frangibly attached to and depending from said skirt,
   an inverted band-retaining hoop around a lower edge of said band for engaging the container below the locking bead thereof,
   arcuate hinges foldably connecting said hoop to said band, said hinges spaced along a hinge line at said lower edge of said band,
   relief windows in said hoop, said windows being adjacent said lower edge and spacing said hinges,
   the circumferential width of the hinges being greater than the circumferential width of the windows,
   said hoop being movable from a first, as molded, position in which it projects angularly inward in a direction away from said top, to a second, use, position in which it projects angularly inward and toward said top for engagement with the locking bead of a container, said hoop having portions which extend across the respective windows and which are deformed by hoop stress when said hoop is in said second position, said band having a line weakness from said hinge line up to an upper edge of said band, said line of weakness opening when said band is detached from said skirt, said hoop being split across at least part of its width, in line with said line of weakness of said band, said band and hoop springing open, in response to said hoop stress, at said line of weakness and split to a greater diameter when said closure is removed from a container.

13. A tamper indicating closure for use in sealing a container of the type having closure securing means and a locking bead below the securing means, said closure comprising, a top, a shell with a depending skirt, means on said skirt for engaging the closure securing means of the container, a tamper indicating band frangibly attached to and depending from said skirt, an inverted band-retaining hoop around a lower edge of said band for engaging the container below the locking bead thereof, arcuate hinges foldably connecting said hoop to said band, said hinges spaced along a hinge line at said lower edge of said band, relief windows in said hoop, said windows being adjacent said lower edge and spacing said hinges, the width of the hinges being in the range of 1.5 to 6× the width of the windows, said hoop being movable from a first, as molded, position in which it projects angularly inward in a direction away from said top, to a second, use, position in which it projects angularly inward and toward said top for engagement with the locking bead of a container, said hoop having portions which extend across the respective windows and which are deformed by hoop stress when said hoop is in said second position, said band having a line of weakness from said hinge line up to an upper edge of said band, said line of weakness opening when said band is detached from said skirt, said hoop being split across at least part of its width, in line with said line of weakness of said band, said band and hoop springing open, in response to said hoop stress, at said line of weakness and split to a greater diameter when said closure is removed from a container.

14. A tamper indicating closure for use in sealing a container of the type having a closure securing means and a locking bead below the securing means, said closure comprising, a top, a shell with a depending skirt, means on said skirt for engaging the closure securing means of the container, a tamper indicating band frangibly attached to and depending from said skirt, a band-retaining hoop around a lower edge of said band for engaging the container below the locking bead thereof, arcuate hinges connecting said hoop to said band, said hinges spaced along a hinge line at said lower edge of said band, relief windows in said hoop, said windows being adjacent said lower edge and spacing said hinges, said hoop projecting angularly inwardly for engagement with the locking bead of a container, said hoop being deformed and under hoop stress, said hoop having portions which extend across the respective windows and which are deformed radially outwardly, said hoop having a distal edge of polygonal shape, portions of said edge which are between said windows lying radially inward of portions thereof which are across said windows, said band having a line of weakness from said hinge line up to an upper edge of said band, said line of weakness rupturing when said band is detached from said skirt, said hoop being split across at least part of its width, in line with said line of weakness of said band, said band and hoop springing open to a greater diameter at said line of weakness and split when said closure is removed from a container.

15. The closure of claim 14 wherein said distal edge is cold set by deformation.

* * * * *